US 6,611,525 B1

(12) United States Patent
Natanson et al.

(10) Patent No.: US 6,611,525 B1
(45) Date of Patent: Aug. 26, 2003

(54) APPARATUS FOR AND METHOD OF LEARNING MAC ADDRESSES IN A LAN EMULATION NETWORK

(75) Inventors: Sarit Shani Natanson, Tel Aviv (IL); Ronit Aizicovich, Ramat Gan (IL); Golan Schzukin, Tel Aviv (IL); Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/413,917

(22) Filed: Oct. 7, 1999

(51) Int. Cl.$^7$ ................................................ H04L 12/28
(52) U.S. Cl. .................................................. 370/395.53
(58) Field of Search ........................ 370/395.53, 395.1, 370/401, 466

(56) References Cited

U.S. PATENT DOCUMENTS 5,982,773 A * 11/1999 Nishimura et al. ..... 370/395.53
6,223,149 B1 * 4/2001 Margulis et al. .............. 703/27
6,456,962 B1 * 9/2002 Allingham et al. ........... 703/26

OTHER PUBLICATIONS

CISCO IOS Switching Services Configuration Guide, LAN Emulation Overview, pp. XC–59–65.
LAN Emulation Over ATM Version 2—LUNI Specification—Letter Ballot, AF–LANE–0084.000, pp. 25–26, 29–33, 88–101.
LAN Emulation Over ATM, 1996, pp. 1–11.

* cited by examiner

Primary Examiner—Chau Nguyen
Assistant Examiner—Scott Waite
(74) Attorney, Agent, or Firm—Howard Zaretsky; Paul J. Sutton (57) ABSTRACT

An apparatus for and a method of learning MAC addresses in a Local Area Network (LAN) Emulation (LANE) network implemented over an Asynchronous Transfer Mode (ATM) network. The LEC or LES is adapted to detect when the ATM address associated with a MAC address is no longer valid. Once an invalid ATM address is detected the existing entry can be updated or deleted. A LEC_ID table holding LEC_ID to ATM address bindings is created. Each frame received by the LEC is sniffed in order to find mismatches between the ATM address and the LEC_ID. Optionally, an LE_ARP request message can be forwarded to the LES for learning the new binding. If the MAC address is not found in the LE_ARP table, an entry can be created and added to the table. In another embodiment, the LES is adapted to detect when the MAC to ATM address binding stored in the internal LE_ARP cache is no longer valid. The LE_ARP table is populated by examining LE_ARP request and response sent and received by the LEC. Upon detection of a mismatch in LEC_ID, the LES can delete or update the entry. The LES generates and sends a LE_NARP or targetless LE_ARP request message which finctions to notify the LEC in the ELAN of a changed MAC to ATM address binding.

23 Claims, 6 Drawing Sheets

APPARATUS FOR AND METHOD OF LEARNING MAC ADDRESSES IN A LAN EMULATION NETWORK

FIELD OF THE INVENTION

The present invention relates generally to data communications networks and more particularly relates to an apparatus for and a method of learning MAC addresses in a Local Area Network (LAN) Emulation (LANE) network implemented over an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be, transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation Implemented Over ATM

Today, most data traffic in existing customer premise networks travels over legacy LANs. It is desirable to permit these legacy LANs and their embedded infrastructure to operate with new ATM networks currently being deployed. To enable an easier migration path to ATM, the ATM forum has defined LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Figure 1:
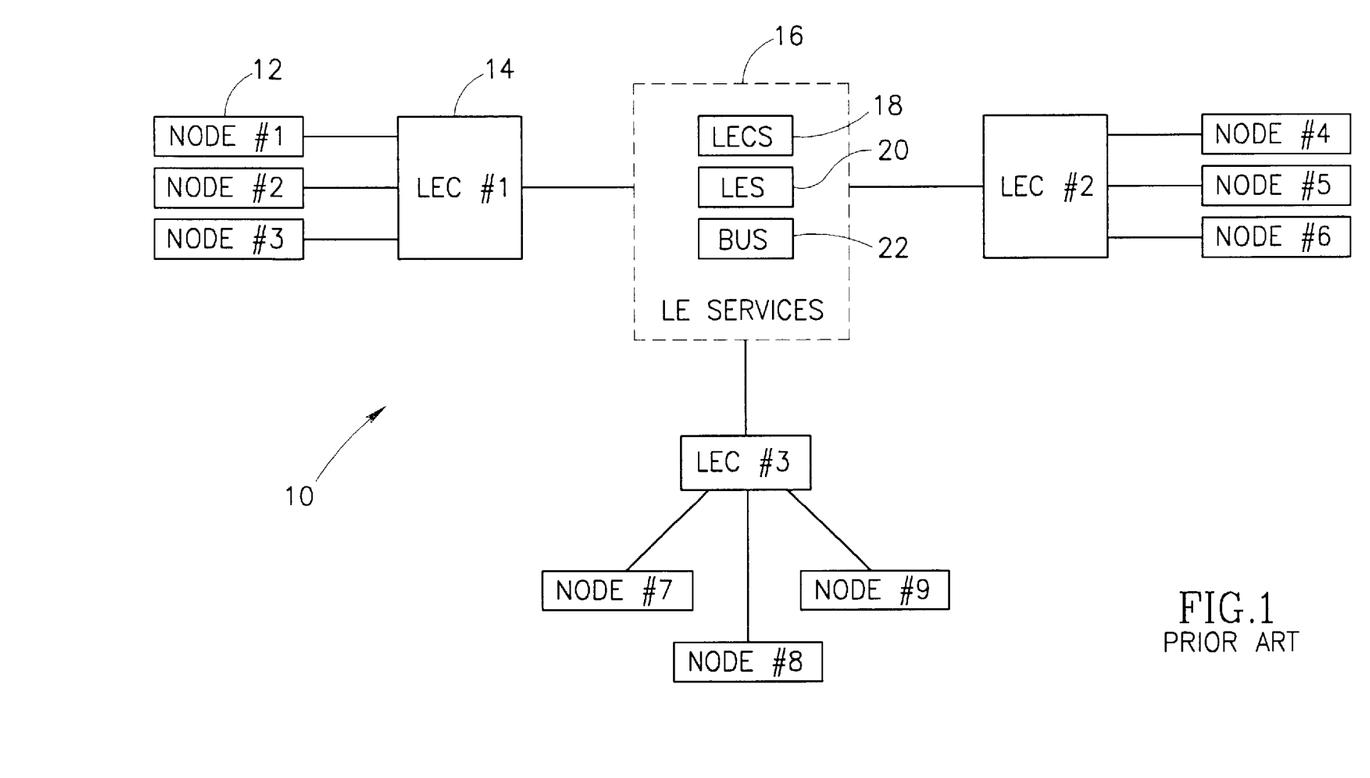
FIG. 1 is a block diagram illustrating prior art Version 1.0 LAN Emulation services implemented over an ATM network.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A block diagram illustrating prior art Version 1.0 LAN Emulation services available to nodes in an ATM network is shown in FIG. 1. The network, generally referenced 10, comprises an ATM network cloud (not shown) which includes a plurality of LECs 14 labeled LEC #1 through LEC #3 and a plurality of nodes 12 labeled node #1 through node #9 connected to LECs #1 through #3. The LECs are connected to a LAN Emulation services block 16 which comprises LECs 18, LES 20 and BUS 22.

The entities defined by the LANE architecture include LAN Emulation Clients (LECs) 14, a LAN Emulation Server (LES) 20, a Broadcast and Unknown Server (BUS) 22 and LAN Emulation Configuration Server (LECs) 18. The LES, BUS and LECs constitute what is known to as the LANE Service (block 16).

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose. The main function of the LEC is to perform data forwarding, address resolution and registration of MAC addresses with the LES. Once the LEC registers with a LES, it receives address resolution requests for unregistered destinations from the LES.

In order for a LEC to participate in an emulated LAN, the LEC must first communicate with an LECs. It may utilize a specific ATM address of the LECS if it knows it, or, as is typically the case, may use the well known address of the LECS to establish communications.

As described previously, the LANE Service comprises several entities: LAN Emulation Server (LES), a Broadcast and Unknown Server (BUS) and LAN Emulation Configuration Server (LECS). The LES provides joining, address registration and address resolution services to the LECs. Note that a given LES serves only a single emulated LAN.

The LES implements the control coordination function for the ELAN by providing a mechanism for registering and resolving unicast MAC addresses to ATM addresses. An LEC is connected to only one LES entity and may register LAN destinations it represents and multicast MAC addresses it wishes to receive. A LEC also queries its LES when the LEC needs to resolve a MAC address to an ATM address. The LES either responds directly to the LEC or forwards the query to other LECs so they may respond.

The BUS functions to sequence and distribute data sent by LECs to the broadcast MAC address 'FFFFFFFFFFFF', multicast data (to provide the connectionless data delivery characteristics of a shared network) and unicast data sent by a LEC before a data direct VCC has been established. Note that a given BUS serves only one emulated LAN. The main functions of the BUS include distributing data with multicast MAC (MMAC) addresses, initial unicast data (where the MAC address has not yet been resolved to a direct ATM connection) and to distribute data.

In operation, all LECs send data frames to the BUS entity which is operative to serialize the frames and re-transmit them directly or indirectly to other LECs. Note that serialization is necessary in order to prevent the cells making up the ATM Adaptation Layer 5 (AAL5) frames originating from different sources from being interleaved. The BUS entity participates in the LE Address Resolution Protocol (LE_ARP) to enable an LEC to locate its BUS. The BUS must also handle ATM connections and manage its distribution group.

Note that the BUS entity may have multiple interfaces which support receiving and forwarding of specific multicast MAC addresses frames over multiple VCCs. A LEC that does not need to receive all multicast MAC address frames, may inform the LES during initialization (in LANE Version 2.0 discussed below). The LBS then selectively forwards multicast MAC addresses frames only those LECs that have requested them.

In sum, all broadcast, multicast and unknown traffic to and from a LEC passes through the BUS entity. Therefore, if the processing capabilities of the BUS are limited, a potential bottleneck may arise that severely effects the performance of the network.

The LECS contains the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

The LES implements the control coordination function for the ELAN. The LESs provide a facility for registering and resolving unicast and multicast MAC addresses to ATM addresses. A LEC is connected to only one LES and may register LAN destinations it represents and multicast MAC addresses it wished to receive with its LES. A LEC will also query its LES when the LEC wishes to resolve a MAC address to an ATM address. The LES either responds directly to the LEC or forwards the query to other LECs so they may respond.

Figure 2:
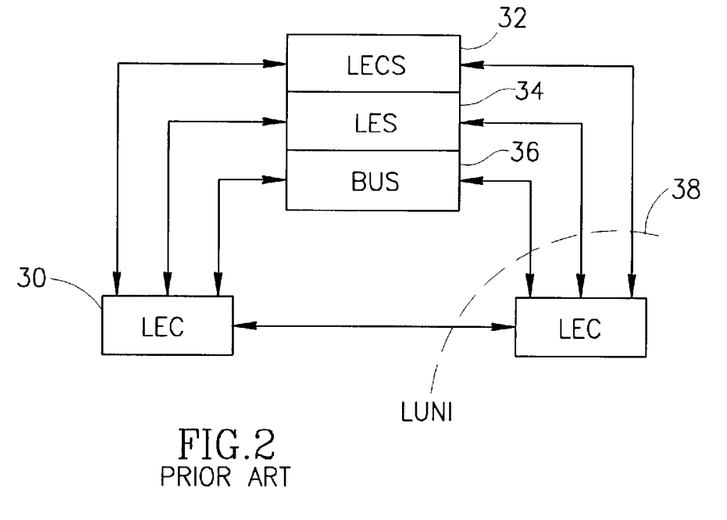
FIG. 2 is a block diagram illustrating the relationship between LEC, LECS, LES and BUS entities in prior art Version 1.0 LAN Emulation services.

A block diagram illustrating the relationship between LEC, LECS, LES and BUS entities in prior art Version 1.0 LAN Emulation services is shown in FIG. 2. Two LECs 30 are shown in communication with each other in addition to an LECS 32, LES 34 and BUS 36. The protocol the LECs use to communicate with each other and to the LAN Emulation services is known as LAN Emulation User to Network Interface (LUNI). The scope of the LUNI is indicated by the dashed line 38.

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface, between LANE Services entities, i.e., LECs, LESs, BUSs, etc. In addition, LNNI defines a new LAN Emulation Service entity, i.e., the Selective Multicast Server (SMS), to enhance the handling of Multicast traffic.

Figure 3:
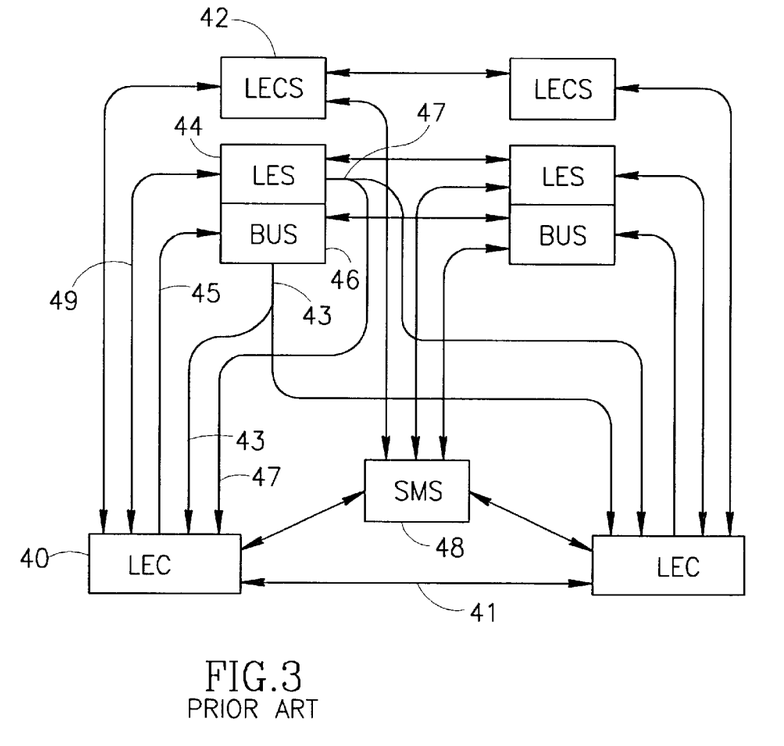
FIG. 3 is a block diagram illustrating the relationship between LEC, LECS, LES, BUS and SMS entities in prior art Version 2.0 LAN Emulation services.

A block diagram illustrating the relationship between LEC, LECS, LES, BUS and SMS entities in prior art Version 2.0 LAN Emulation services is shown in FIG. 3. Two LECs 40 are shown in communication with each other and to either of two LECS 42, LES 44 and BUS 46. In addition, both LECs and the LECS, LES and BUS communicate with a Selective Multicast Server (SMS) entity 48. Note that there can be more than one SMS per ELAN.

Communications among LANE components is normally handled via several types of SVCs, i.e., unidirectional, bidirectional, point-to-point (P2P) and point-to-multipoint (P2M), also known as VCCs. The LES communicates with each individual LEC via a control direct VCC 49 and with all LECs collectively via control distribute VCC 47; the BUS communicates with each individual LEC via a multicast send VCC 45 and with all LECs collectively via multicast forward VCC 43; and two individual LECs communicate with each other via a data direct VCC 41.

A brief description of the process normally performed to enable a LEC will now be presented. Initially, the LEC requests to join an ELAN by first setting up a bidirectional P2P Configure Direct VCC to the LECS in order to find the ATM address of the LES for its ELAN. Using the same VCC, the LECS returns the ATM address and the name of the LES for the ELAN associated with the LEC.

The LEC then sets up a bidirectional P2P Control Direct VCC to the LES associated with its ELAN for the purpose of exchanging control traffic. Once a Control Direct VCC is established between a LEC and LES, it remains up. The LES for the ELAN then sets up a bidirectional P2P Configure Direct VCC to the LECS to verify that the client is permitted to join the ELAN. The configuration request from the LES contains the MAC address of the LEC, its ATM address and the name of the ELAN. The LECS checks its database and determines if the LEC can join that particular ELAN. It uses the same VCC to reply to the LES whether the LEC is or is not permitted to join.

If the join is permitted, the LES adds the LEC to the unidirectional P2M Control Distribute VCC and confirms the join over the bidirectional P2P Control Direct VCC. If not permitted, the LES rejects the join over the bidirectional P2P Control Direct VCC. The LEC then sends LE_ARP packets for the .broadcast address that causes VCCs to be set up between the LEC and the BUS entity.

During communications on the ELAN, each LEC builds a local LE_ARP table that maps MAC addresses to ATM addresses. When a LEC first joins an ELAN, its LE_ARP table does not contain any entries and it has no information about destinations on or behind its ELAN. The LEC uses the LE_ARP process to learn about the destination when a packet is to be transmitted, i.e., to find the ATM address corresponding to the known MAC address.

The LEC first sends an LE_ARP request to the LES over the Control Direct VCC. The LES forwards the LE_ARP request to all the LECs on the ELAN over the Control Distribute VCC. Any LEC that recognizes the MAC address responds with its ATM address over the Control Direct VCC. The LES forwards the response over the Control Distribute VCC. The LEC, upon receipt, adds the MAC address/ATM address pair to its LE_ARP cache. The LEC is then able to establish a Data Direct VCC to the desired destination and begin sending packets to the ATM address.

When a LEC wants to transmit broadcast, multicast or unicast traffic with an unknown address, it first sends the packet to the BUS over the Multicast Send VCC. The BUS forwards, i.e., floods, the packet to all LECs over the Multicast Forward VCC. Note that this VCC branches at each ATM switch. The switch is operative to forward the packets to multiple outputs.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECSs assign LECs to non operational LESs. All the LECs previously connected to the failed LES are reassigned by the LECS to other active LESs.

As described above, in the LANE Version 1.0 architecture (see FIGS. 1 and 2), the BUS is responsible for handling three types of traffic: broadcast, multicast and unknown unicast. The multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS (to the LES for unicast traffic). In other words, regardless of the size and membership of the multicast group, a multicast message is broadcast to all the LECs and all members attached to the LECs.

To summarize, the disadvantage of LANE Version 1.0 is (1) the lack of true multicast capability (multicast is treated as broadcast) and (2) the lack of redundancy (if a LES or BUS fails the entire ELAN goes down). In particular, multicast traffic is limited by the forwarding capability of the BUS and by the slowest downlink to a LEC. Further, in switched edge device, all multicast traffic is distributed to all the ports.

Since, however, up till now relatively little multicast traffic was generated, the redundancy problem was considered far more important. Today, however, and in the near future the increase in multicast traffic generated by applications will cause the first problem, i.e., lack of true multicast, to become an important problem as well.

The LNNI portion of LANE Version 2.0 addresses these issues by providing a means of offloading the multicast traffic from the BUS. With reference to FIG. 3, this is achieved by the addition of one or more Selective Multicast Servers (SMSs) 48 that are responsible for handling multicast traffic.

A standard prior art SMS (and BUS) is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on difference network devices. In addition, SMSs introduce themselves to the LECS after obtaining the LES(s) from the LECS. After this first introduction they introduce themselves again to the LES(s) themselves. Further, SMSs must forward multicast traffic to the BUS to ensure backward compatibility with non-SMS enabled LECs.

Both the BUS and SMS comprise, among other things, a segmentation and re-assembly (SAR) unit. As described above, a major function (of the SMS is to receive and distribute multicast traffic.

In operation, one or more LECs establish connections to the BUS. Cells forwarded to the BUS from one or more LECs are received and input to the SAR. A reassembly unit functions to reassemble the cells into packets. The cells are not forwarded until all cells comprising a packet are received. The BUS cannot multiplex different multicast traffic streams on the cell level, thus the requirement for an SAR in prior art BUS entities. It can, however, multiplex on the packet level.

Once all cells making up a packet have arrived, the packet is then segmented into cells and distributed to each receiver, i.e., member, in the particular multicast group associated with the packet.

For traditional LAN traffic, AAL5 is the means used by which Ethernet and Token Ring frames are encapsulated into ATM cells. AAL5, however, does not provide any multiplexing capabilities. This means that cells derived from a particular frame are queued until all have arrived at the SAR before the packet is passed to the segmentation unit and transmitted as cells to the plurality of multicast destinations, i.e., receivers.

Note that in practice, the BUS (and SMS) may be implemented in various devices but typically, it is implemented in ATM switches. More than one BUS and SMS may reside in a network with each BUS and SMS residing on a different switch.

Initially, the LEC requests the LES for a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_REQ message arrives at a LES from a LEC for a particular MMAC, the LES replies with the ATM address of the LES. If the LES does know about any SMSs, it sends the LEC the ATM address of the BUS. Thus, the BUS is the default in the event an SMS cannot be assigned.

In a network with multicast, the sending and receiving functions are independent of each other. In other words multicast connections may involve overlapping LECs or they may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection.

For listening, the LEC issues an LE_REGISTER_REQ message for a particular MMAC and sends it to the LES. The LES, using the LNNI SCSP protocol, instructs the SMS to add the LEC to the point to multipoint connection.

MAC Addresses and Station Relocation

Figure 4:
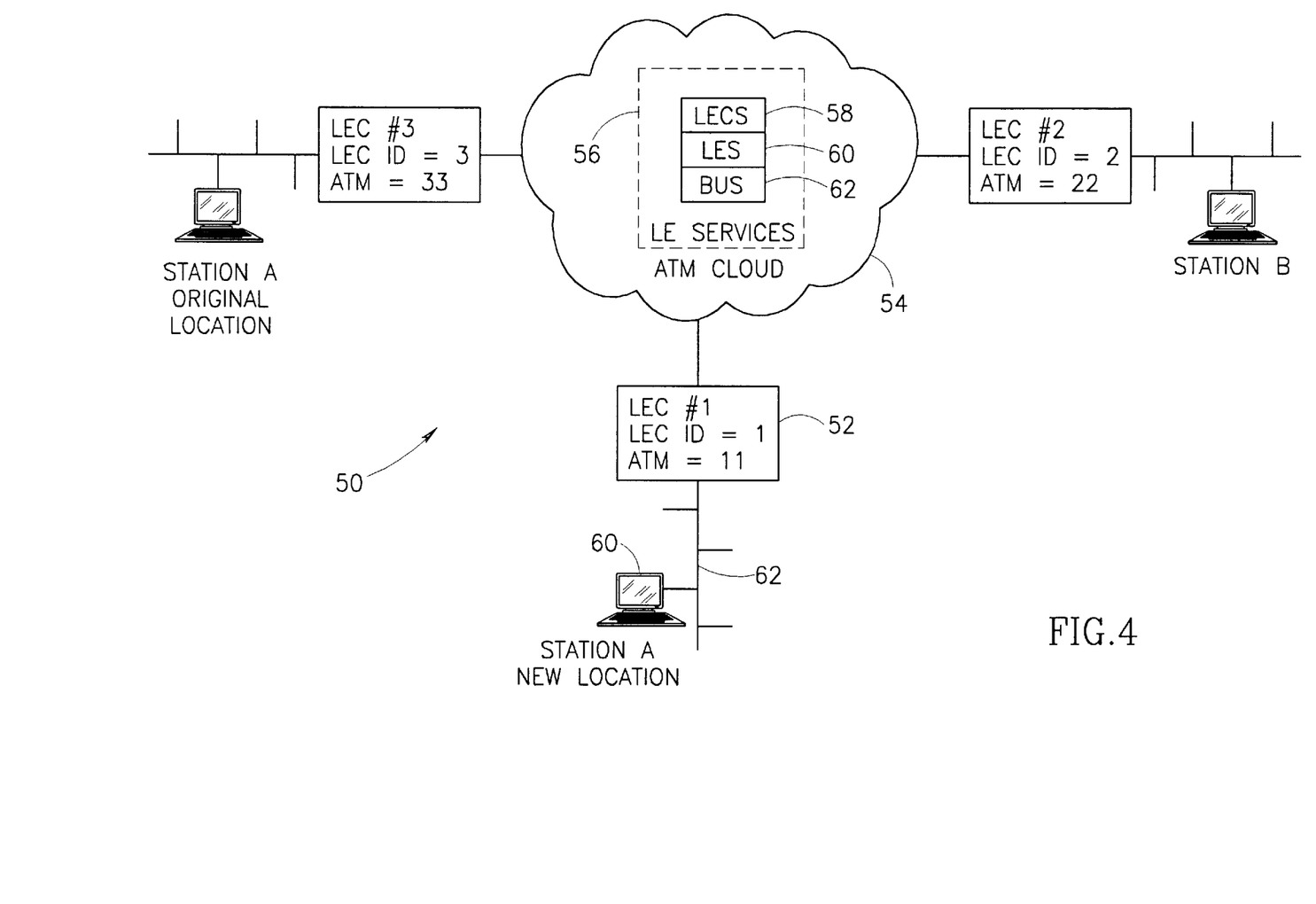
FIG. 4 is a block diagram illustrating an example LANE network over an ATM network wherein a station A in the network is moved from one LEC to another.

A block diagram illustrating an example LANE network over an ATM network wherein a station A in the network is moved from one LEC to another is shown in FIG. 4. The LANE network, generally referenced 50, is implemented over an ATM network comprising ATM cloud 54. The ATM cloud comprises a set of LE services 56 including LECS 58, LES 60 and BUS 62. Three LECs 52, labeled LEC #1 through #3 are connected to the ATM cloud and have an associated LEC_ID and ATM address. LEC #1 has LEC_ID=1, ATM address=11; LEC #2 has LEC_ID 2, ATM address=22; and LEC #3 has LEC_ID=3, ATM address=33. Each LEC has any number of stations, hosts or other network devices 60 connected to it as denoted by LAN 62. In particular, station A is originally connected to LEC #3 and station B is connected to LEC #2. Station A starts a session with station B and in response, LEC #3 establishes a data direct VC to LEC #2 and communications occur as normal.

As described previously, the main functions of the LEC are to perform data forwarding, address resolution and registration of MAC addresses with the LES. During operation of the LE network, data frames are transmitted through the ATM network carried in the payload portion of ATM cells. Normally, upon receiving an Ethernet frame for transmission, e.g., forwarding or flooding, over the LE network from a directly or indirectly attached station a LEC first examines the MAC destination address (DA) of the frame. The LEC then checks whether the destination MAC address exists in its LE_ARP cache. Each LEC maintains an LE_ARP table containing mappings between MAC address and ATM address.

If the MAC address is found in the LE_ARP cache, the LEC retrieves the mapping of MAC to ATM address from the table and uses the information to either create or find the VCC with the ATM address and then to forward the frame on the VCC. If no entry matching the MAC address is found, however, the LEC forwards the frame to the BUS and generates and sends an LE_ARP_REQUEST message. The LE_ARP request message is sent over the control direct VCC to the LES in order to determine the binding between the MAC address and the ATM address.

With reference to FIG. 4, suppose at some point in time, station A is moved firm its original location connected to LEC #3 to a new location connected to LEC #1. When station A is moved to its new location a problem occurs in that it cannot receive data for a period of time. In some cases the period of time is on the order of five minutes and in other cases it may be indefinite. The reason for this is described in more detail below.

At the point when station A is moved, stations A and B already have an active session via a data direct VC between LEC #3 and LEC #2. After station A is moved to its new location, the data direct VC remains active but the mapping (binding) between station A's MAC address and its ATM address is not correct. The LE_ARP cache table in LEC #3 contains the following entry:

| LE_ARP Table in LEC #3 | |
|---|---|
| MAC Address | ATM Address |
| . | . |
| MAC of Station A | 33 |
| . | . |

When station A comes up, in its new location, it most likely attempts to establish a new connection with station B. Note that the frame cannot be sent using the data direct VC already established between LEC #2 and LEC #3. Note also that LEC #1 would most likely send the frame via the BUS since most TCP/IP protocols begin operation by the transmission of a broadcast message. In this case, LEC #1 would not send a LE_ARP request message for is frame (LE_ARP messages are only sent for unicast frames).

Station B, after receiving the frame, attempts to reply to the message with a unicast frame. Note that if station A sends a broadcast frame, there is no problem since the BUS floods the message to all the LECs in the ELAN and the correct MAC/ATM address mapping will be discovered. When station B replies with a unicast message, LEC #2 searches in its LE_ARP table for an entry corresponding to the station A MAC address. The ATM address found, however, corresponds to LEC #3. LEC #2 sends the frame on the already established data direct VC to LEC #3 but station A is no longer connected to it.

The result is that station A ultimately times out and then attempts to re-establish a session. This scenario may or may not continue depending on how LEC #2 is configured. If aging is enabled, the entry will be erased after the aging timeout period expires, typically 5 minutes or less. If the aging of the LE_ARP cache in LEC #2 is configured to refresh on source addresses received from data direct VCCs, then the entry will eventually timeout since no frames will be received with station A MAC as source address.

If, however, the aging of the LE_ARP cache in LEC #2 is configured to refresh on receiving of source address or transmission of destination addresses, then the entry will never timeout since frames will be transmitted with station A MAC and ATM address of LEC #3 in response to the traffic transmitted from station A in its new location. The entry also will never be deleted if the LEC is not enabled at all.

Once the entry in the LE_ARP cache is deleted, the new ATM address of station A is determined using the standard LE_ARP request mechanism. Once the new ATM address is obtained from the ELAN, the LEC adds the address to the LE_ARP cache and establishes a data direct VC to LEC #1.

The problem described above potentially overloads the network with unnecessary traffic since station A attempts retransmission over and over. The traffic generated by station A causes station B to transmit messages to LEC #3. Another result is that the network takes a relatively long time to recognize that a station has been moved from one location to another. As described above, depending on how the LEC is configured, the move may never be recognized. If aging in the LEC is enabled, the station will not be recognized in the new location for at least a time period equal to the aging time out period configured in the LEC.

SUMMARY OF THE INVENTION

The present invention solves the problems associated with the prior art by providing an apparatus for and a method of learning MAC addresses in a Local Area Network (LAN) Emulation (LANE) network implemented over an Asynchronous Transfer Mode (ATM) network. The present invention can be utilized to immediately recognize the relocation of a station from one location in the network to another. This is achieved by adapting the LEC or LES to detect when the ATM address associated with a MAC address is no longer valid. Once an invalid mapping between MAC addresses and ATM address is detected any number of optional actions may be performed, including, but not limited to, updating the existing entry or deleting the existing entry.

In accordance with the present invention, the LEC is adapted to detect when the MAC to ATM address binding stored in the internal LE_ARP cache is no longer valid. This is achieved by establishing an additional LEC_ID table holding LEC_ID to ATM address bindings. This table is filled using data extracted from various messages containing control frames transmitted between different LE entities. Examples of messages include FLUSH request and response messages and LE_ARP request and response messages. Each frame received by the LEC is examined, i.e., sniffed, in order to find mismatches between the ATM address and the LEC_ID. The LEC first extracts the MAC source address from the frame and, using the LE_ARP cache, determines the corresponding ATM address. The LEC_ID table is consulted using the ATM address as a look up. The corresponding LEC_ID from the table is then compared with the LEC_ID field extracted from the frame. If a mismatch is found the entry is either deleted or updated.

Optionally, an LE_ARP request message can be forwarded to the LES/LECs for learning the new binding. If the MAC address is not found in the LE_ARP table, an entry can be created and added to the table. The entry contains the MAC source address and the corresponding ATM address is retrieved from the table (if an entry exists in the table). If the binding between LEC_ID and ATM address is not found, a request can be generated and sent to the LES. Note that the LES already holds this information in its database. The LES generates and sends a response containing the binding back to the LEC.

The hardware in the LEC can be adapted to implement MAC learning in accordance with the present invention. A mapping table is created for mapping MAC source address to LEC_ID. The hardware is configured to retrieve the MAC source address and LEC_ID from the frame, access the table using the MAC source address and then compare the LEC_ID to the LEC_ID extracted from the frame. Upon a mismatch, the frame or portions thereof are forwarded to the software. The software learns the new MAC to ATM binding and either deletes or updates corresponding entries in the tables maintained by the LEC.

Alternatively, the LES can be adapted to detect when the MAC to ATM address binding stored in the internal LE_ARP cache is no longer valid. The method here is similar to that of the method performed by the LEC. In this case, the LEC_ID table holding LEC_ID to ATM address bindings is provided for as specified in the ATM Forum's "LAN Emulation Over ATM Version 2-LUNI Specification," AF-LANE-0084.000, July 1997, incorporated herein by reference in its entirety (hereinafter referred to as the 'LUNI specification'). In addition, the LE_ARP table is also established and populated as optionally provided for by the LUNI specification. In this case, however, the LE_ARP table is populated by examining (i.e., learning) LE_ARP request and response traffic sent by the LEC on the control distribute VCC to the LES. Upon detection of a mismatch in LEC_ID, the LES can delete or update the entry. Additionally, the LES generates and sends a LE_NARP or targetless LE_ARP request message which functions to notify the LEC in the ELAN of a changed MAC to ATM address binding.

There is provided in accordance with the present invention, in a LAN Emulation Client (LEC) having an LE_ARP table and configured for use in an Asynchronous Transfer Mode (ATM) network implementing LAN Emulation (LE), the LE including a Broadcast and Unknown Server (BUS) entity, a method of learning Media Access Control (MAC) addresses of stations connected to the LE, the method comprising the steps of mapping LEC_ID to ATM address and storing the given LEC_ID to ATM address bindings in a LEC_ID table in the LEC, sniffing frames forwarded by the BUS entity within the LE and received by the LEC, determining a first LEC_ID from the LEC_ID table corresponding to a MAC source address extracted, from the received frame, comparing the first LEC_ID with a second LEC_ID extracted from the received frame and if the LEC_ID and the second LEC_ID do not match, performing an action in response thereto.

The step of sniffing comprises the steps of establishing a LEC_ID to ATM address binding table and adding entries to the table from data extracted from LE control frames received by the LEC. The messages may comprise FLUSH request and response messages or LE_ARP request and response messages. The step of determining comprises the steps of looking up in the LE_ARP table the ATM address corresponding to the MAC address and looking up in the LEC_ID table the LEC_ID corresponding to the ATM address. The step of performing may comprise the step of deleting the corresponding MAC entry in the LE_ARP table, updating the corresponding MAC entry in the LE_ARP table, deleting the corresponding MAC entry in the LE_ARP fable and sending a LE_ARP request message to a LAN Emulation Server (LES) associated with the LEC.

The method further comprises file step of, if the MAC source address is not found in the LE ARP table, adding an entry to the LE_ARP table including the MAC source address and ATM address corresponding thereto. The step of determining comprises the steps of looking up in the LE_ARP table the ATM address corresponding to the MAC address, looking up in the LEC_ID table the LEC_ID corresponding to the ATM address, if no entry is found in the LEC_ID table corresponding to the ATM address of the received frame, sending a request to a LAN Emulation Server (LES) associated with the LEC and sending a reply to the request to the LEC comprising the binding between the LEC_ID and ATM address. The step of sending comprises the step of utilizing a VERIFY control frame with Type, Length, Value (TLV) adapted to convey the LEC_ID to ATM address binding.

There is further provided in accordance with the present invention, in a LAN Emulation Server (LES) having an LE_ARP table and configured for use in an Asynchronous Transfer Mode (ATM) network implementing LAN Emulation (LE), the LE including a Broadcast and Unknown Server (BUS) entity, a method of learning Media Access Control (MAC) addresses of stations connected to the LE, the method comprising the steps of establishing a connection between the LES and the BUS entity, the connection for listening to traffic communicated thereover, mapping LEC_ID to ATM address and storing the given LEC_ID to ATM address bindings in a LEC_ID table in the LES, establishing an LE_ARP table in the LES for storing MAC to ATM address bindings, sniffing frames forwarded by the BUS entity within the LE and received by the LES, determining a first LEC_ID retrieved from the LEC_ID table corresponding to a MAC source address extracted from the received frame, comparing the first LEC_ID with a second LEC_ID extracted from the received frame and if the LEC_ID and the second LEC_ID do not match: deleting the MAC address entry from the LE_ARP table, notifying all LECs that the current MAC/ATM address binding is no longer valid.

The step of establishing a connection between the LES and the BUS entity comprises adding a leaf to a point-to-multipoint connection originating with the BUS. The step of establishing a connection between the LES and the BUS entity comprises adapting the LES, and BUS entities to communicate with each other over an internal connection in the event both are collocated in the same device. The method further comprises the step of learning, if the MAC source address is not found in the LE_ARP table, whereby MAC address entries, including the MAC source address and ATM address corresponding thereto, are added to the LE_ARP table from data extracted from frames forwarded by the BUS and received by the LES. The frames comprise REGISTER request and response frames.

The step of extracting comprises the step of sniffing LE_ARP request and response messages received by the LES. The step of determining comprises the steps of looking up in the LE_ARP table the ATM address corresponding to the MAC address and looking up in the LEC_ID table the LEC_ID corresponding to the ATM address. The method further comprises the step of updating the corresponding MAC entry in the LE_ARP table if the LEC_ID and the second LEC_ID do not match. The step of notifying comprises the step of sending a targetless LE_ARP_REQUEST message to all LECs in the Emulated LAN (ELAN) associated therewith. The step of notifying comprises the step of sending a LE_NARP_REQUEST message to all LECs in the Emulated LAN (ELAN) associated therewith.

There is still further provided in accordance with the present invention a LAN Emulation Client (LEC) having an LE_ARP table and configured for use in an Asynchronous Transfer Mode (ATM) network implementing, LAN Emulation (LE), the LE including a Broadcast and Unknown Server (BUS) entity, the LEC comprising means for mapping LEC_ID to MAC address and storing the given address bindings in a MAC table, means for extracting frame LEC_ID and frame MAC source address information from received LE frames, means for reading a MAC LEC_ID from the MAC table using the frame MAC source address is an index thereto, means for comparing the MAC LEC_ID with the frame LEC_ID extracted from the received LE frame and means for updating the MAC table if the MAC LEC_ID and the frame LEC_ID do not match.

The means for updating the MAC table comprises a processor, a queue, adapted to hold the contents of the LE frame or portions thereof, the queue being written to in the event the MAC LEC_ID and the frame LEC_ID do not match, software means operative on the processor for reading the contents of the queue, determining the valid ATM address and LEC_ID corresponding to the frame MAC source address and updating the MAC table with the valid ATM address and LEC_ID.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| AAL | ATM Adaptation Layer |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| IISP | Interim Inter-Switch Signaling Protocol |
| IP | Internet Protocol |
| IPX | Internetwork Packet Exchange |
| ITU | International Telecommunications Union |
| LAN | Local Area Network |
| LANE | LAN Emulation |
| LE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| OC | Optical Carrier |
| P2M | Point-to-Multipoint |
| P2P | Point-to-Point |
| PNNI | Private Network to Network Interface |
| PVC | Permanent Virtual Circuit |
| SAR | Segmentation and Reassembly |
| SCSP | Server Cache Synchronization Protocol |
| SMS | Selective Multicast Server |
| SVC | Switched Virtual Circuit |
| UNI | User to Network Interface |
| VCC | Virtual Channel Connection |
| VCI | Virtual Circuit Identifier |
| VPI | Virtual Path Identifier |

The present invention solves the problems associated with the prior art by providing an apparatus for and a method of learning MAC addresses in a Local Area Network (LAN) Emulation (LANE) network implemented over an Asynchronous Transfer Mode (ATM) network. The present invention can be utilized to immediately recognize the relocation of a station from one location to another. This is achieved by adapting the LEC or LES to detect when the ATM address associated with a MAC address is no longer valid. Once an invalid ATM address is detected any number of optional actions may be performed, including, but not limited to, updating the existing entry or deleting the existing entry.

To aid in understanding the principles of the present invention, the invention is described in the context of an example LE network as shown in FIG. 4 wherein station A is moved from its original location connected to LEC #3 to its new location connected to LEC #1. The LECs and LES are modified in accordance with the present invention as described herein. Three embodiments are presented: the first two intended to operate in the LEC and the third intended to operate in the LES. Note, however, that the apparatus and method of the present invention can be applied to numerous other networks and it is intended that the scope of the invention not be limited to the example presented herein.

Learning MAC to ATM Address Binding: LEC Implementation

Figure 5:
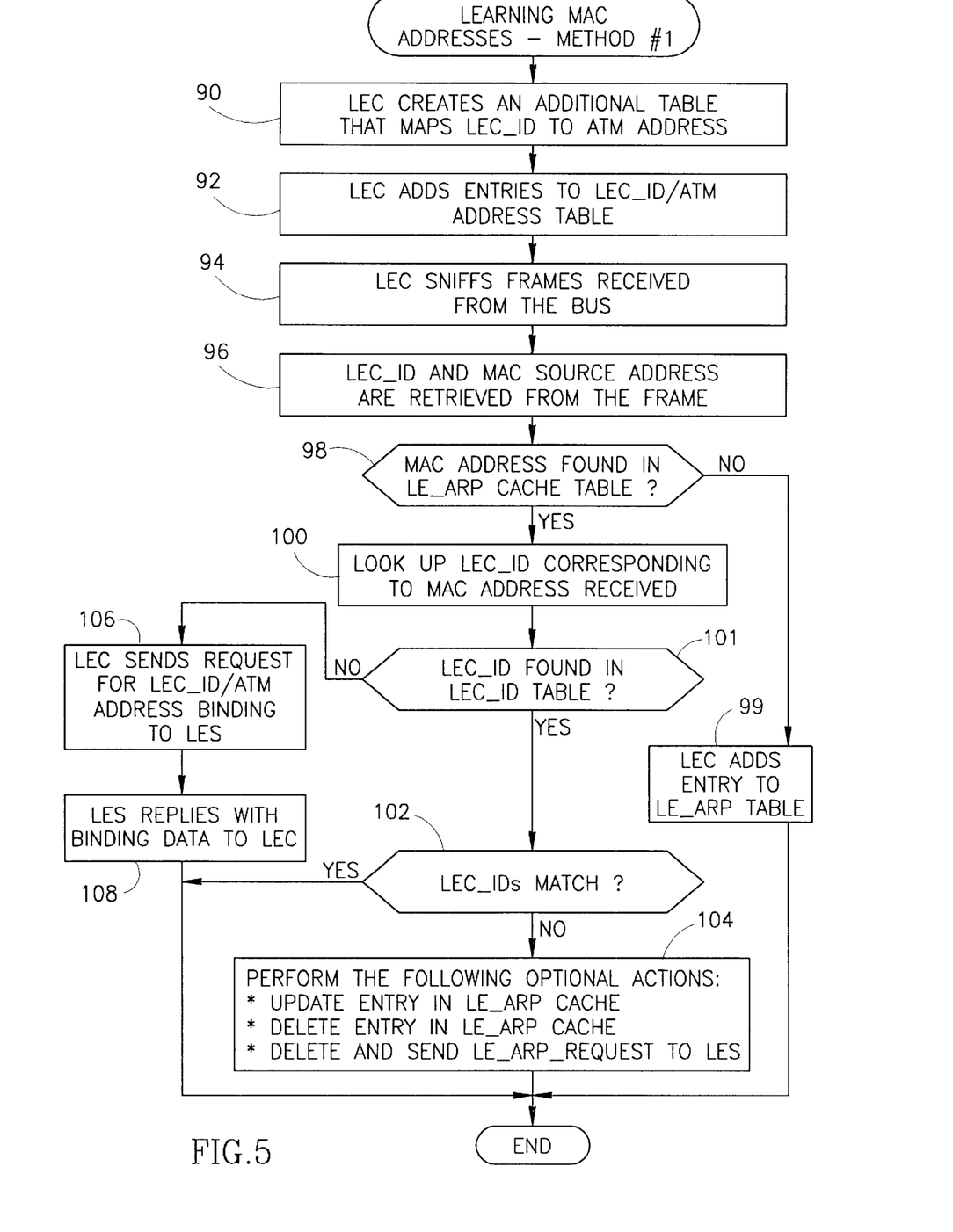
FIG. 5 is a flow chart illustrating a first method of the present invention of learning MAC addresses that is implemented on the LEC.

In accordance with the present invention, the LEC is adapted to detect when the MAC to ATM address binding stored in the internal LE_ARP cache is no longer valid. A flow chart illustrating a first method of the present invention of learning MAC addresses that is implemented on the LEC is shown in FIG. 5. With reference also to FIG. 4, an additional table, termed a LEC_ID table, is established in the LEC for holding LEC_ID to ATM address bindings (step 90). The LEC_ID table is created in each LEC. An example of the LEC_ID table in LEC #2 (before being updated by the present invention) is shown below.

| LEC_ID Table in LEC #2 | |
|---|---|
| LEC_ID | ATM Address |
| . | . |
| 3 | 33 |
| . | . |

The LEC adds entries to this table using data extracted from various messages containing control frames transmitted between different LE entities (step 92). The LEC is adapted to listen to, i.e., sniff, these messages and retrieve information from control frames. Examples of messages include FLUSH request and response messages and LE_ARP request and response messages. Note that the LEC_ID table is necessary since the LEC does not normally have any table that maps LEC_ID to ATM address. The table is typically only partially filled since not every frame received contains the necessary data to populate an entry in the table and because not all LECs send the relevant control frames.

The LEC is also adapted to sniff traffic that is transmitted by the BUS (step 94). The LEC is able to identify traffic originated by the BUS by recognizing the unique VPI/VCI value corresponding to the BUS. Normally, the LEC simply forwards its stations all frames received from the BUS. In accordance with the present invention, however, the LEC sniffs this traffic to extract the LEC_ID and MAC source address from the frame (step 96).

The MAC source address extracted from the received frame is then used as an index to the LE_ARP cache table. The LE_ARP table is normally maintained in each LEC and contains the mapping from MAC address to ATM address. If an entry is found (step 98), the LEC_ID corresponding to the MAC source address is then determined (step 100). The LEC_ID is found by first looking up the ATM address corresponding to the MAC address in the LE_ARP table. The ATM address found from the LE_ARP table is then used to look up the corresponding LEC_ID using the LEC_ID table.

First, it is determined whether a LEC_ID entry exists in the LEC_ID table (step 101). If so, the LEC_ID found in the LEC_ID table is compared to the LEC_ID extracted from the received frame. The LEC_ID is found in the first two bytes of the LE frame carried in the payload of an AAL5 packet. If the LEC_ID found in the LEC_ID table matches the LEC_ID extracted from the received frame (step 102), the MAC entry in the LE_ARP table is determined to be correct and no action is taken. If, however, the LEC_ID found in the LEC_ID table does not match the LEC_ID extracted from the received frame, the LEC performs any of the following optional actions (step 104).

Note that the compare operation can just as well be performed on ATM addresses rather than on LEC_IDs. In this case, one ATM address is found using the MAC address as an index to the LE_ARP cache, while the second ATM address is found using the LEC_ID extracted from the frame.

The LEC can update the entry in the LER_ARP cache with the correct MAC to ATM address binding if the new LEC_ID to ATM address binding is known by the LEC. The LEC may delete the entire entry in the LE_ARP table and rely on standard LAN Emulation operation to add the correct entry to the table. Alternatively, the LEC may delete the entry and send an LE_ARP request message to the LES to learn the new binding. The LES then replies with the correct ATM address after flooding the request to all the LECs in the ELAN.

If during operation, the MAC address is not found in the LE_ARP cache (step 98), the LEC can optionally do nothing or be adapted to create and add an entry to the LE_ARP table (step 99). The entry added contains the MAC source address and corresponding ATM address. The MAC address is learned from the received fine and the ATM address is found from the LEC_ID table. In this manner, the present invention provides a learning function when the MAC address is not found in the cache. This aids the LEC in teaming as many MAC to ATM address mappings as possible so as to increases its knowledge of the network. Note that the present invention serves to expand the LE_ARP table in this manner without utilizing LE_ARP request and response message.

Alternatively, in the event the MAC address is not found in the LE_ARP table (step 98), the LEC can optionally be adapted to do nothing. Eventually, a LE_ARP request will be generated and the binding will be determined using standard LE operations.

If during operation, the ATM address is not found in the LEC_ID table (step 101), i.e., the LEC_ID to ATM address binding is not found, the LEC is optionally adapted to send a request for the LEC_ID/ATM address binding to the LES (step 106). Since the LES already holds this information in its database it can easily be forwarded to the LEC (step 108). A request and response message can be constructed, such as a VERIFY control frame using a suitable TLV adapted to convey the LEC_ID to ATM address binding information.

Figure 6:
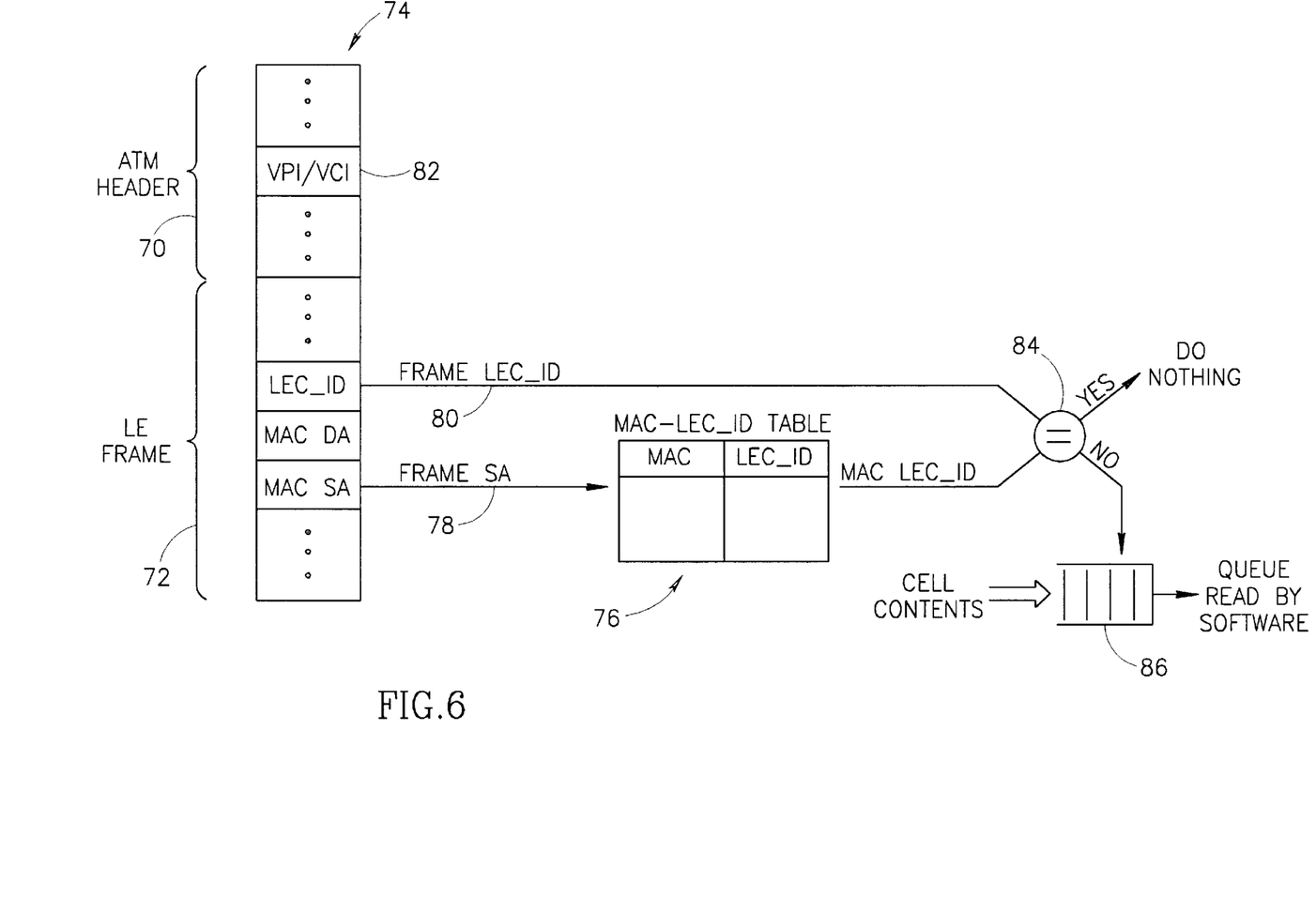
FIG. 6 is a block diagram illustrating a technique of learning new MAC addresses implementable in hardware.

The technique described above of learning MAC addresses can be implemented partially in hardware within the LEC. A block diagram illustrating a technique of learning new MAC addresses implementable in hardware is shown in FIG. 6. In this embodiment, the hardware in the LEC is adapted to implement the MAC learning in accordance with the present invention.

The ATM cell 74 consisting of an ATM header portion 70 and LE frame portion 72 is schematically shown. A mapping (i.e., hash) table 76 is created within the hardware for mapping MAC source addresses to LEC_ID. The MAC source address from the LE frame is used as the index to this table. The MAC address and LEC_ID information in the table is inserted and maintained by the software. A new entry is added, for example, when a new MAC address from the ATM side of the LEC is received.

Note that similar to the software method described above, the hardware can be adapted to hold two tables, an LE_ARP table comprising MAC to ATM address mappings and an LEC_ID table (updated by the software) holding LEC_ID to ATM address mappings which are used to indirectly obtain the LEC_ID. The hardware typically processes VPI/VCI values rather than actual ATM addresses. Further, in one possible implementation, the frame MAC source address is used as an index into an OVC_PTR table. The OVC_PTR table contains shortened versions of the VPI/VCI values. The LEC_ID is then read from the table.

In either case, the hardware is configured to retrieve the MAC source address and LEC_ID from the LE frame 72. Using the frame MAC source address, the table 76 is accessed so as to output a corresponding MAC LEC_ID. The MAC LEC_ID is input to one input of comparator 84. The second input is the frame LEC_ID extracted from the LE frame 72. The MAC LEC_ID and frame LEC_ID are compared and if they match, the bindings are correct and nothing need be done.

If, however, the MAC LEC_ID and frame LEC_ID do not match, the contents of the cell or a portion thereof are placed in a queue 86. The queue is read by the software which functions, based on the data forwarded to it, to update the tables maintained in the hardware and/or the software. The software learns the new MAC to ATM binding and either deletes or updates corresponding entries in the hardware and/or software tables maintained by the LEC. The software portion functions similarly to that described in connection with FIG. 5, with the difference being the mechanism of detecting when the MAC to ATM address binding is not valid. In this embodiment, the detection is performed in the hardware.

It is important to note that the software host does not need to process all broadcast frames received from the BUS. In accordance with the invention, the hardware functions to filter the received frames such that only those frames (i.e., MAC addresses) that need to be learned are sent to the software. The software functions to obtain the correct MAC address, LEC_ID and ATM address and updates the hardware tables accordingly.

As opposed to the previously described software embodiment, the compare operation is performed in hardware at wire speed rather than in software which places a heavy burden on the computing resources of the LEC. Thus, this hardware based embodiment is operative to relieve the software of the burden of performing the compare operation on every single frame.

Learning MAC to ATM address binding: LES implementation

Figure 7:
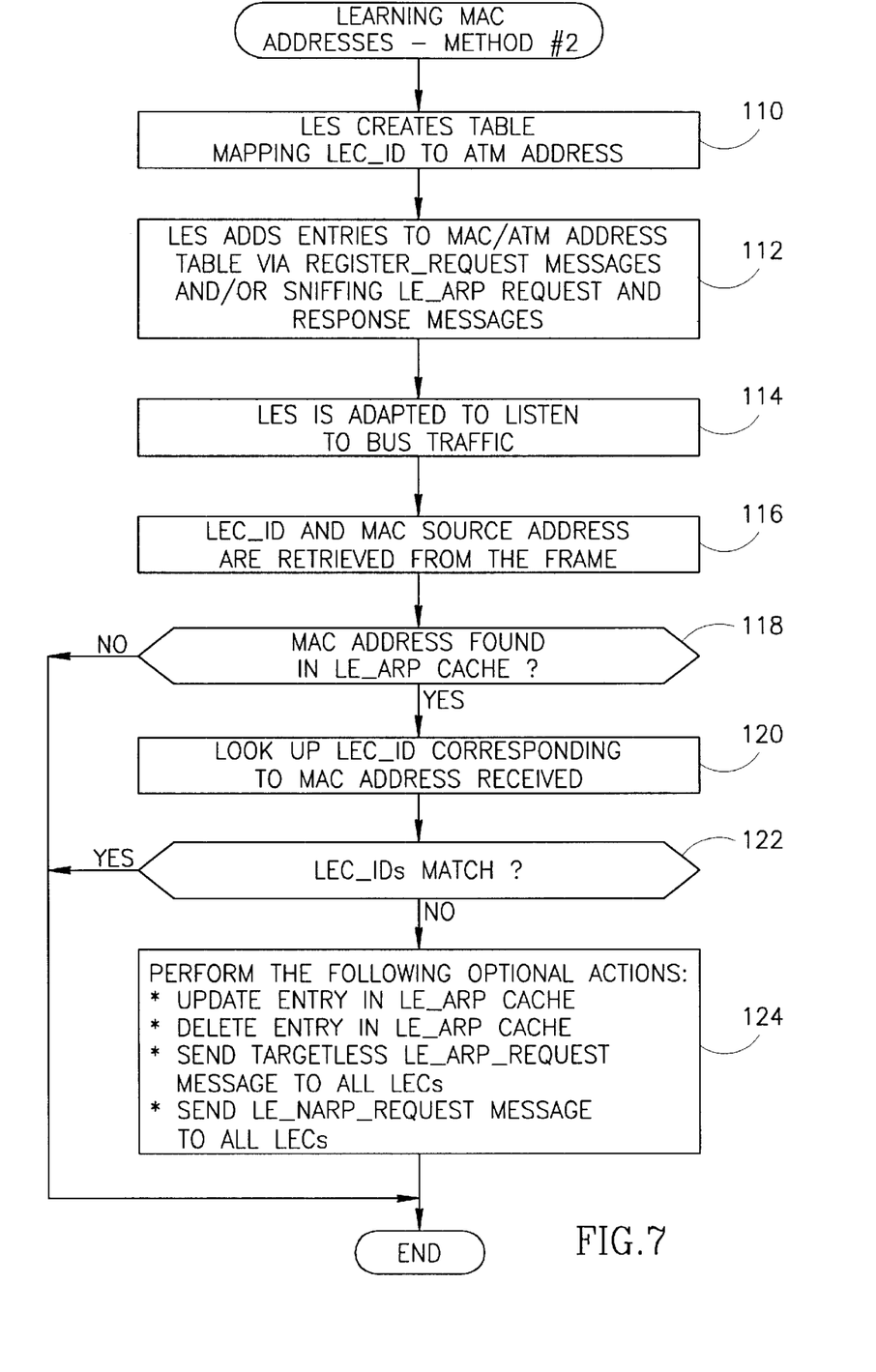
FIG. 7 is a flow chart illustrating a second method of the present invention of learning MAC addresses that is implemented on the LES.

Alternatively, the LES can be adapted to detect when the MAC to ATM address binding stored in the internal LE_ARP cache is no longer valid. A flow chart illustrating a second method of the present invention of learning MAC addresses that is implemented on the LES is shown in FIG. 7. The method here is similar to that of the method performed by the LEC with a few differences. In this embodiment, the LES utilizes the table previously created for storing the mappings from LEC_ID to ATM address (step 110). This LEC_ID table holding LEC_ID to ATM address bindings is provided for by the LUNI specification. Under normal operation, when the LEC joins the ELAN using the JOIN_REQUEST message, the LES issues the LEC_ID and sends it to the LEC via JOIN_RESPONSE message. Thus, the LES has knowledge of the LED_ID to ATM address bindings.

In addition, the LE_ARP table is also established and populated as optionally provided for by the LUNI specification (step 112). In this case, however, the LE_ARP table can be populated from data extracted from sniffing LE_ARP request and response messages. Data for the table can also be derived from the procedure each LEC takes part in when attempting to join an ELAN. Data also is derived from registration request traffic generated by the LECs when a previously unknown station is detected. Note that the LES can use this table to avoid flooding LE_ARP request messages if the MAC entry is found in the table.

The LES is adapted to sniff, i.e., listen to, traffic transmitted by the BUS (step 114). The LES is able to identify traffic originated by the BUS by examining the frame for the unique VPI/VCI value corresponding to the BUS. Normally, the LES does not listen to BUS traffic. In accordance with the present invention, however, the LES sniffs this traffic to extract the LEC_ID and MAC source address from frames (step 116). The LES can be adapted to sniff BUS traffic by adding a leaf to the point to multipoint call originated by the BUS. Alternatively, an internal direct connection can be set up between the LES and BUS if they are collocated in the same device, e.g., the same ATM switch, edge device, etc.

The MAC source address extracted from the received frame is then used as an index to the LE_ARP cache table (step 118). The LE_ARP table is optionally maintained in the LES, in accordance with the LUNI specification, and contains the mapping from MAC address to ATM address. It is required to be established and maintained in the LES for proper operation of the present invention. If an entry is found in the table, the LEC_ID corresponding to the MAC source address is then determined (step 120). The LEC_ID is found by first looking up the ATM address corresponding to the MAC address in the LE_ARP table. The ATM address found is then used to look up the corresponding LEC_ID using the LEC_ID table.

The LEC_ID found in the LEC_ID table is compared to the LEC_ID extracted from the received frame. The LEC_ID is found in the first two bytes of the LE frame carried in the payload of an AAL5 packet. If the LEC_ID found in the LEC_ID table matches the LEC_ID extracted from the received frame (step 122), the MAC entry in the LE_ARP table is determined to be correct and no action is taken. If, however, the LEC_ID found in the LEC_ID table does not match the LEC_ID extracted from the received frame, the LES performs any of the following optional actions (step 124).

Note that the compare operation can just as well be performed on ATM addresses rather than on LEC_IDs. In this case, one ATM address is found using the MAC address as an index to the LE_ARP cache, while the second ATM address is found using the LEC_ID extracted from the frame.

The LES can update the entry in the LE_ARP cache with the correct MAC to ATM address binding. Note that the LEC_ID table in the LES is always fill as a result of the join phase. The LES may delete the entire entry in the LE_ARP table whereby the correct binding will eventually be added to the table due to operation of standard LAN Emulation processes. In both cases, the LES generates and sends an LE_NARP_REQUEST message (LANE Version 1.0) so that other LECs learn about the changed MAC to ATM address binding. The request advertises that the old binding (MAC address and ATM address), that is known by the LES, is no longer valid and provides a new binding. In response, a receiving LEC deletes all entries in its LE_ARP cache that match the old MAC to ATM address binding. The LEC may replace the entries with the new bindings included in the request For LANE Version 2.0 LECs, the LES generates and sends a targetless LE_ARP_REQUEST message which includes only the old MAC address and not the old ATM address. The request permits the LES to advertise a valid LE_ARP cache binding to other LECs in its ELAN. Upon receipt, the LEC deletes any LE_ARP cache bonding having the old MAC address and replaces such bindings with information contained in the request message. The targetless LE_ARP and LE_NARP request messages are sent by the LES over the standard control distribute connection previously established.

While the invention has been described with respect to a limited number of embodiments, it will be appreciated that many variations, modifications and other applications of the invention may be made.

What is claimed is:

1. A method of learning Media Access Control (MAC) addresses of stations connected to a LAN Emulation (LE) network, for use in a LAN Emulation Client (LEC) having an LE_ARP table and configured for use in an Asynchronous Traner Mode (ATM network implementing LE, said LE including a Broadcast and Unknown Server (BUS) entity, said method comprising the steps of;

creating a LEC_ID table in said LEC and storing LEC_ID to ATM address bindings therein extracted from control messages transmitted between LE entities;

sniffing messages originated by said stations forwarded by said BUS entity within said LE and received by said LEC;

determining a first LEC_ID from said LEC_ID table corresponding to a MAC source address of a station extracted from said received message;

comparing said first LEC_ID with a second LEC_ID extracted from said received message; and if said LEC_ID and said second LEC_ID do not match, performing an action in response thereto.

2. The method according to claim 1, wherein said step of sniffing comprises the steps of:

adding entries to said table from data extracted from LE control frames received by said LEC.

3. The method according to claim 2, wherein said messages comprise FLUSH request and response messages.

4. The method according to claim 2, wherein said messages comprise LE_ARP request and response messages.

5. The method according to claim 1, wherein said step of determining comprises the steps of:

looking up in said LE_ARP table the ATM address corresponding to said MAC address; and looking up in said LEC_ID table the LEC_ID corresponding to said ATM address.

6. The method according to claim 1, wherein said step of performing comprises the step of deleting the corresponding MAC entry in said LE_ARP table.

7. The method according to claim 1, wherein said step of performing comprises the step of updating the corresponding MAC entry in said LE_ARP table.

8. The method according to claim 1, wherein said step of performing comprises the steps of:

deleting the corresponding MAC entry in said LE_ARP table; and sending a LE_ARP request message to a LAN Emulation Server (LES) associated with said LEC.

9. The method according to claim 1, further comprising the step of, if said MAC source address is not found in said LE ARP table, adding an entry to said LE_ARP table including said MAC source address and ATM address corresponding thereto.

10. The method according to claim 1, wherein said step of determining comprises the steps of:

looking up in said LE_ARP table the ATM address corresponding to said MAC address;

looking up in said LEC_ID table the LEC_ID corresponding to said ATM address;

if no entry is found in said LEC_ID table corresponding to the ATM address of the received frame, sending a request to a LAN Emulation Server (LES) associated with said LEC; and sending a reply to said request to said LEC comprising the binding between the LEC_ID and ATM address.

11. The method according to claim 10, wherein said step of sending a reply comprises the step of sending a VERIFY control message with Type, Length, Value (TLV) adapted to convey the LED_D to ATM address binding.

12. A method of learning Media Access Control (MAC) addresses of stations connected to a LAN Emulation (LE) network, for use in a LAN Emulation Server (LES) having an LE_ARP table and configured for use in an Asynchronous Transfer Mode (ATM) network implementing (LE), said LE including a Broadcast and Unknown Server (BUS) entity, said method comprising the steps of:

establishing a connection between said LES and said BUS entity, said connection for listening to traffic communicated thereover;

creating a LEC_ID table in said LES and storing LEC_ID to ATM address bindings therein extracted from control messages transmitted between LE entities;

establishing an LE_ARP table in said LES for storing station MAC address to ATM, address bindings;

sniffing messages originated by said stations forwarded by said BUS entity within said LE and received by said LES over said connection;

determining a first LEC_ID retrieved from said LEC_ID table corresponding to a MAC source address of a station extracted from said received message;

comparing said first LEC_ID with a second LEC_ID extracted from said received message; and if said first LEC_ID and said second LEC_ID do not match:
deleting the MAC address entry from said LE_ARP table;
notifying all LECs that the current MAC/ATM address binding is no longer valid.

13. The method according to claim 12, wherein said step of establishing a connection between said LES and said BUS entity comprises add a leaf to a point-to-multipoint connection originating with said BUS.

14. The method according to claim 12, wherein said step of establishing a connection between said LES and said BUS entity comprises adapting said LBES and BUS entities to communicate with each other over an internal connection in the event both are collocated in the same device.

15. The method according to claim 12, further comprising the step of learning, if said MAC source address is not found in said LE_ARP table, whereby MAC address entries, including said MAC source address and ATM address corresponding thereto, are added to said LE_ARP table from data extracted from messages forwarded by said BUS and received by said LES.

16. The method according to claim 15, wherein said messages comprise REGISTER request and response messages.

17. The method according to claim 15 wherein said step of exiting comprises the step of sniffing LE_ARP request and response messages received by said LES.

18. The method according to claim 12, wherein said step of determining comprises the steps of:
looking up in said LE_ARP table the ATM address corresponding to said MAC address; and
looking up in said LEC_ID table the LEC_ID corresponding to said ATM address.

19. The method according to claim 12, further comprising the step of updating the corresponding MAC entry in said LE_ARP table if said LEC_ID and said second LEC_ID do not match.

20. The method according to claim 12, wherein said step of notifying comprises the step of sending a targetless LE_ARP_REQUEST message to all LECs in the Emulated LAN (ELAN) associated therewith.

21. The method according to claim 12, wherein said step of notify comprises the step of sending a LE_NARP_REQUEST message to all LECs in the Emuluted LAN (ELAN) associated therewith.

22. A LAN Emulation Client (LEC) having an LE_ARP table and configured for use in an Asynchronous Transfer Mode (ATM) network implementing LAN Emulation (LE), said LE including a Broadcast and Unknown Server (BUS) entity, said LEC comprising:

means for mapping LEC_IDs with MAC address and storing resultant address bindings in a station MAC table;

means for extracting a first LEC_ID and a first station MAC source address from received LE frames;

means for looking up a second LEC_ID from said MAC table using said first station MAC source address is an index thereto;

means for comparing said second LEC_ID with said first LEC_ID extracted from said received LE frame; and means for updating said station MAC table if said second LEC_ID and said first LEC_ID do not match.

23. The LEC according to claim 22, wherein said means for updating said MAC table comprises:
a processor;
a queue adapted in hold the contents of said LE frame or portions thereof, said queue being written to in the event said second LEC_ID and said first LEC_D do not match;
software means operative on said processor for:
reading the contents of said queue;
determining the valid ATM address and LEC_ID corresponding to said first MAC source address; and
updating said MAC table with said valid ATM address and LEC_ID.

* * * * *